Nov. 22, 1938.     J. W. SMITH     2,137,987
PULLEY
Filed Feb. 11, 1936
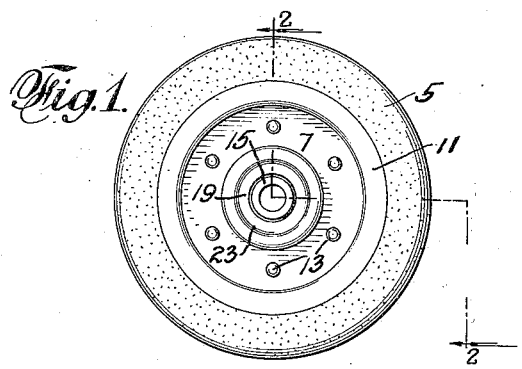
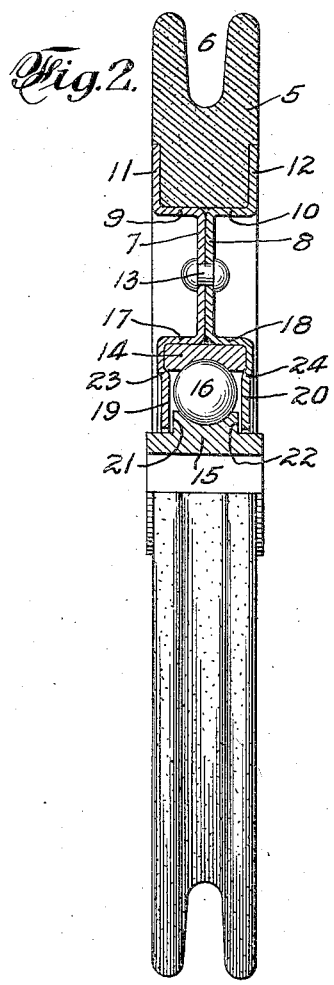
INVENTOR
JOHN W. SMITH
BY
ATTORNEYS Patented Nov. 22, 1938

2,137,987

UNITED STATES PATENT OFFICE 2,137,987

PULLEY

John W. Smith, New Britain, Conn., assignor to The Fafnir Bearing Company, New Britain, Conn., a corporation of Connecticut Application February 11, 1936, Serial No. 63,348

1 Claim. (Cl. 74—230.7)

My invention relates to a pulley more particularly adapted for use in connection with airplane controls.

It is the general object of the invention to provide an improved anti-friction bearing pulley which is simple in construction, relatively cheap to manufacture and which is rugged and effective in use.

In the drawing which shows, for illustrative purposes only, a preferred form of the invention—

Fig. 1 is a side view in elevation of a pulley illustrating features of the invention; and Fig. 2 is an enlarged quarter sectional view taken substantially in the plane of the line 2—2 of Fig. 1.

In said drawing 5 indicates a pulley rim portion which may be made of one of the several molded products, such as bakelite. The rim portion is annular in form and may be relatively narrow radially. The rim is preferably provided with a pulley groove 6 in the usual manner. The rim 5 is held in a metal channel, in the form shown provided by employing two sheet metal plates 7—8, having axially outwardly directed flanges 9—10 and then radially outwardly directed flanges 11—12, thus forming an annular radially outwardly directed channel into which the pulley rim 5 fits. In the preferred form the pulley rim is rabbeted to receive the flanges, so that the pulley rim and flanges 11—12 are flush at the sides. The plates 7—8 are held together in any suitable manner, as by means of rivets 13.

The hub pulley bearing is of the anti-friction type comprising an outer bearing ring 14 and an inner bearing ring 15 and interposed anti-friction bearing members, such as balls 16. The plates 7—8 are formed to provide a channel for the reception of the hub bearing. As illustrated the plates have axially outwardly directed flanges 17—18 and radially inwardly directed seal flanges 19—20, which bridge the space between the two bearing rings and the inner portions of which may fit into rabbeted spaces 21—22 at opposite edges of the inner bearing ring and extend into bearing sealing proximity to the inner bearing ring. The side flanges 19—20 are preferably crimped in, as indicated at 23—24, at the zone of the bore of the outer bearing ring, so that the latter, in addition to merely resting in the circumferentially extending inwardly opening channel is actually held in the channel annularly completely therearound.

The side plates being provided with the seal plates 19—20 obviates the necessity of providing separate seals for the bearing and the construction is considerably cheapened. The side plates may be duplicates of each other and the assembly of the parts is a very simple operation. The entire pulley is light in weight and yet is very rugged in construction and will take very substantial strains incident to use, particularly where there are side pulls tending to rock the bearing on the shaft or axle. The rim portion being made of relatively light material renders the entire construction light in weight and yet the pulley has substantially the strength of much heavier, clumsier pulleys now employed. The hub bearing is quite effectively sealed and the entire construction is simple and rugged and the parts relatively cheap to manufacture.

If desired each of the side plates 7—8 may have radially extending ribs or channels struck out therefrom intermediate the rivets 13 and merging into the flanges 9, 10, 17, 18, so as to form in effect hollow spokes to give added strength against twisting and other strains.

While a preferred form of the invention has been disclosed it is to be under stood that various changes may be made within the scope of the invention as defined in the appended claim.

I claim:

A pulley including a continuous annular rim member formed of molded material of the general character of Bakelite substantially homogeneous throughout and having a peripheral groove therein, a pair of annular metal side plates embracing opposite sides of said rim member for reinforcing and holding the same both axially and radially, an anti-friction bearing including outer and inner bearing rings with interposed anti-friction bearing members, the outer ring of said anti-friction bearing being mounted and held centrally of and between said metal side plates and free of said annular rim member.

JOHN W. SMITH.